No. 759,006. PATENTED MAY 3, 1904.
P. T. B. NEVIUS.
COVER HOLDER FOR TABLE DISHES.
APPLICATION FILED JULY 20, 1903.
NO MODEL.
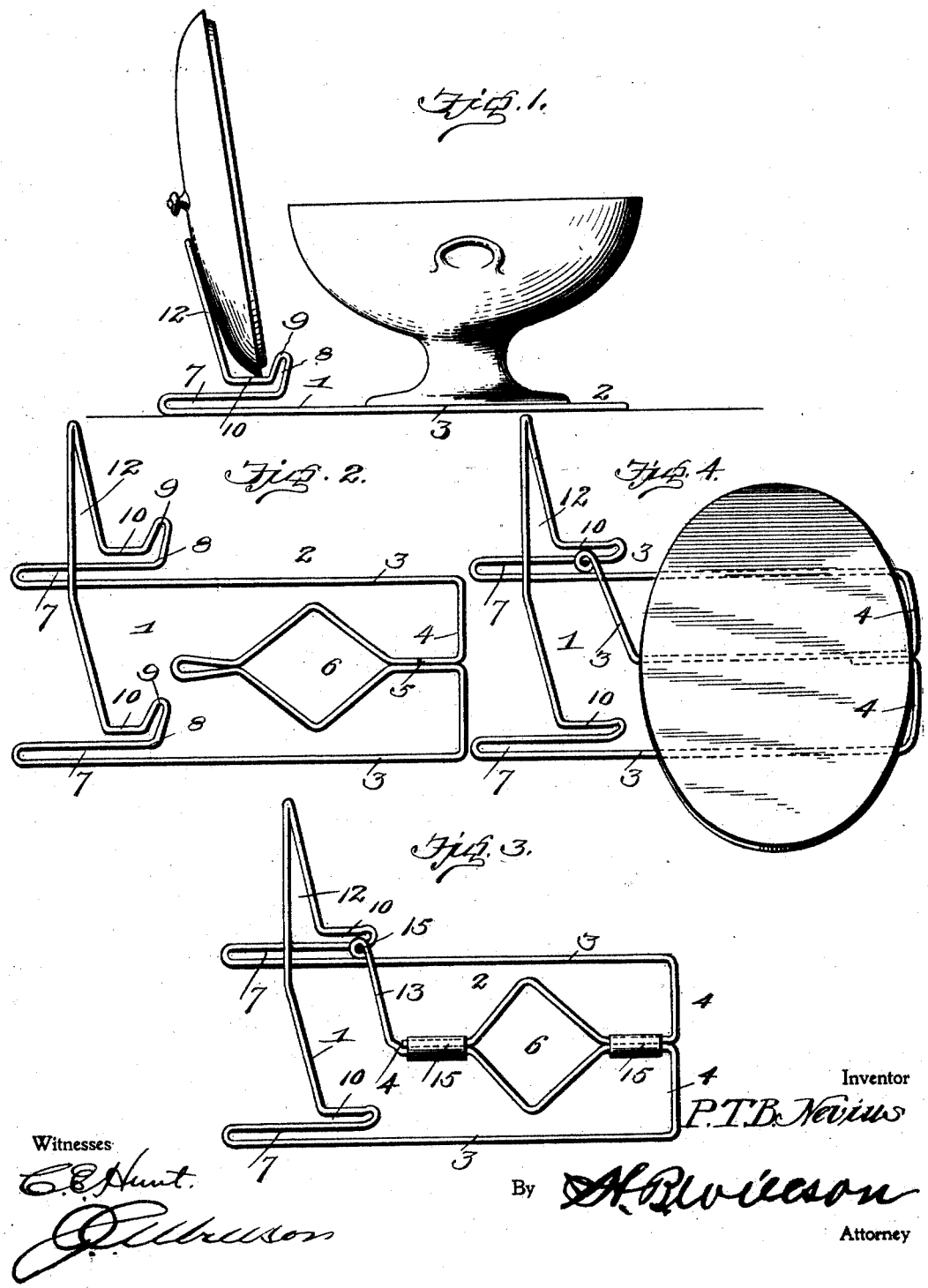
Witnesses
Inventor
P. T. B. Nevius
By
Attorney No. 759,006. Patented May 3, 1904.

UNITED STATES PATENT OFFICE.

PETER T. B. NEVIUS, OF NEW BRUNSWICK, NEW JERSEY.

COVER-HOLDER FOR TABLE-DISHES.

SPECIFICATION forming part of Letters Patent No. 759,006, dated May 3, 1904.

Application filed July 20, 1903. Serial No. 166,305. (No model.)

*To all whom it may concern:*

Be it known that I, PETER T. B. NEVIUS, a citizen of the United States, residing at New Brunswick, in the county of Middlesex and State of New Jersey, have invented certain new and useful Improvements in Cover-Holders for Table-Dishes; and I do declare the following to be a full, clear, and exact description of the invention, such as will enable others skilled in the art to which it appertains to make and use the same.

This invention relates to holders for the covers of table-dishes.

The object of the invention is to provide a holder for the covers of vegetable and other table-dishes which will support the same when removed from the dish in a convenient position to be grasped and replaced on the dish when through serving from the same and which will furthermore support the cover in such position as to prevent the water of condensation which has accumulated on the inner side of the same from the steaming contents of the dish from dripping on the table-cloth.

Another object is to provide a holder having in combination therewith and formed as a part of the same a mat upon which the dish rests, thereby protecting the table from the hot dish.

A further object is to provide such a combined cover, holder, and mat which will be simple, strong, and durable, neat and unobstructive in design, and which can be cheaply manufactured and sold.

With these and other objects in view the invention consists of certain novel features of construction, combination, and arrangement of parts, as will be more fully described, and particularly pointed out in the appended claims.

In the accompanying drawings, Figure 1 is a side view of a dish with the cover removed from the same and in place in the holder. Fig. 2 is a perspective view of the device with the dish removed. Fig. 3 is a similar view of a modified form of the device. Fig. 4 is a similar view of still another form of the same.

Referring more particularly to the drawings, 1 denotes the combined holder and mat, which may be constructed of any suitable material and formed in any suitable manner, but is preferably formed from a single piece of wire rod of suitable size bent to form the holder and the mat.

In forming the holder and mat the wire may be bent in a number of different ways or designs, the essential features of the invention, however, being maintained in all the designs, these features being, namely, a flat base forming the mat, at one end or side of which is formed an upwardly-projecting rest or support for the dish-cover, with means for holding the cover in place on the rest.

Referring more particularly to Figs. 1 and 2, the base or mat portion 2 is substantially rectangular in shape, formed of the side rods 3, which are bent at one end at right angles and toward each other, as at 4, and meeting midway between the side rods 3, where they are turned in and lie in parallel engagement, as at 5. One of the ends of the rods is then carried on and bent to form a substantially diamond-shaped filling 6 within the rectangular frame of the mat. This end of the wire is then brought into engagement with the opposite end to form the portion 5. At the opposite ends of the side rods the same are bent upon themselves, as at 7, and extended forwardly some distance. They are then turned upwardly, as at 8, then downwardly upon themselves, thereby forming stops 9. The rods are then bent rearwardly to form rests 10, then upwardly and across to form a support or back 12 for the cover, the edge of which rests on the portions 10 of the holder, as shown in Fig. 1.

In Fig. 3 the arrangement of the wire is similar to that just described, except that the stops 9 are not formed, in this instance the cover being held upon the rests 10 by means of an arm 13, formed by bending up one end of the wire, as at 14, and forming a loop or eye 15. In this case both ends of the wires are bent to form the diamond-shape filling of the mat frame or base, and where the rods run in parallel engagement the same are held together by band-sleeves 15.

Fig. 4 shows the manner in which the holder may be used in connection with a mat formed of asbestos, willow, or any other material commonly used for making table-mats. In the present instance a mat of asbestos is shown, in which is embedded the rods forming the base of the holder, said base being formed of the side rods 3, which pass through the mat and at one end are bent toward each other along the edge of the mat and then are turned into the same, one of the ends being continued through the mat and projecting out the opposite side of the same, where it is bent upwardly to form the retaining-arm 13 of the cover-holder. The holder portion of this form is constructed the same as in Fig. 3.

The advantages derived from a cover-holding device, as herein shown and described, will be readily apparent. In removing the cover from a dish it may be quickly and easily set into the holder, which will support the same in a position that will prevent moisture on the inside of the same from running out on the table-cloth and which when in this position may be easily grasped by the knob or handle of the same and replaced on the dish.

The construction of the base is such that should the dish be removed from the base the holder would not be upset by the weight of the cover in the same.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

1. A combined cover-holder and mat for dishes, consisting of a base portion forming a mat and a holding portion, said holding portion being provided with rests to receive the edge of the cover, means formed on said rests to retain said cover in place and a support to hold the same in an upright position, substantially as described.

2. A combined cover-holder and mat for dishes formed from a single rod of wire bent to form a base having side pieces an end and a central ornamental filling forming a mat, a cover-holder formed at one end of said base and constructed by bending the side rods of said base first forwardly upon themselves then upwardly at substantially right angles then downwardly forming loops which serve as stops, the rods then being bent rearwardly again a short distance forming rests, then upwardly to form a support whereby the cover is held upon said rests in an upright position, substantially as described.

3. A combined cover-holder and mat for dishes, consisting of a base portion forming a mat and a holding portion formed upon the base portion and comprising rests to receive the edge of the cover, stops at one side of the rests to retain the cover thereon, and a back at the opposite side of the rests to support the cover in an upright position, substantially as set forth.

In testimony whereof I have hereunto set my hand in presence of two subscribing witnesses.

PETER T. B. NEVIUS.

Witnesses:
CHARLES JACKSON,
CHARLES HOUSELL.